United States Patent [19]

Cook et al.

[11] 4,301,009
[45] Nov. 17, 1981

[54] WATER FILTER

[76] Inventors: Don E. Cook; Dorothy M. Cook, both of 2508 Church St., Greenville, Tex. 75401

[21] Appl. No.: 125,984

[22] Filed: Feb. 29, 1980

[51] Int. Cl.³ ............................................ B01D 23/14
[52] U.S. Cl. .................................. 210/278; 210/283; 210/288
[58] Field of Search ............... 210/249, 277, 278, 282, 210/283, 285, 288, 289, 291, 293, 411, 425–427, 440

[56] References Cited

U.S. PATENT DOCUMENTS

| | | | |
|---|---|---|---|
| 645,892 | 3/1900 | Cummings | 210/284 |
| 1,788,510 | 1/1931 | Everson | 210/289 |
| 1,975,306 | 10/1934 | Yates | 210/288 |
| 3,174,623 | 3/1965 | Sloan | 210/289 |
| 3,178,024 | 4/1965 | Jacuzzi | 210/253 |
| 3,207,312 | 9/1965 | Griswold | 210/278 |
| 3,266,628 | 8/1966 | Price | 210/282 |
| 3,529,726 | 9/1970 | Keenan | 210/282 |
| 3,554,377 | 1/1971 | Miller | 210/288 |
| 3,675,775 | 7/1972 | Obidniak | 210/333 |
| 3,994,810 | 11/1976 | Schaeffer | 210/103 |
| 4,098,695 | 7/1978 | Novotny | 210/289 |

*Primary Examiner*—Ivars C. Cintins
*Attorney, Agent, or Firm*—Hubbard, Thurman, Turner, Tucker & Glaser

[57] ABSTRACT

A water filter (10) includes a housing (12) which receives unfiltered water through an input line (54). The water enters the housing (12) and passes through a baffle (30) and upward through charcoal filter material (86). Various pollutants within the water are removed by the charcoal (86). After being filtered by charcoal (86) the water passes through a filter cloth (24) into a lateral line (22). The water is transmitted through a return line (16) which passes through housing (12) into a supply line (46) for delivery to the consumer. The filter (10) is back washed by supplying hot, pressurized water into the return line (16) where it is fed through the lateral line (22) into the charcoal filter material (86). The back wash water passes through the baffle plate (30) and is collected at the bottom of housing (12) where it is forced out through a waste water disposal line (74).

32 Claims, 5 Drawing Figures

FIG. 2

WATER FILTER

TECHNICAL FIELD

The present invention pertains to a water filtering device, and more particularly to such a device which can easily be back washed.

BACKGROUND ART

There is a growing concern with the quality of water available for home and industrial consumption. The standard water supply sources such as reservoirs, lakes and underground wells are becoming increasingly subjected to pollution. As more open land is converted from its natural state to residential and industrial development, there is less natural purification of water, but there are a greater number of sources producing pollution in the form of increased soil erosion and the greater distribution of chemicals such as pesticides and herbicides. As a result, the municipal water supplies are receiving substantially more pollution than in past years and only a portion of this pollution is removed through the treatment facilities utilized by community water systems.

Most water treatment today is directed toward the injection of chlorine to kill bacteria rather than to the removal of particulate matter and various types of chemical pollution. Water purification is most effectively and economically carried out just before its ultimate consumption. This results in filtration only of that water which is to be actually consumed. But the cost of filtering water can become substantial when filter elements are replaced each time they become clogged. Therefore, there is a need for a water filter which can be easily connected at a user location and which is designed to be readily back washed to reduce the cost of operation and thereby eliminate the need for replacing filter elements.

DISCLOSURE OF THE INVENTION

A water filter is provided which includes an elongate, closed housing with a baffle plate secured transversely within the housing and separating the interior of the housing into a first, smaller chamber and a second, larger chamber. The baffle plate is a circular disc having a plurality of passages extending therethrough to permit the passage of water between the first and second chambers. An inlet line extends through the housing into the first chamber and receives water which is provided to the water filter for filtration. A return line extends through the housing into the first chamber, through the baffle plate and upward into a region of the second chamber opposite the baffle plate. A lateral line is connected to the end of the return line within the second chamber. The lateral line has a plurality of openings for passing water therethrough. A filtering medium such as powdered charcoal is provided to substantially fill the second chamber and filter the water flowing therethrough between the baffle plate and the lateral line.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION OF THE INVENTION

Figures 1, 5:
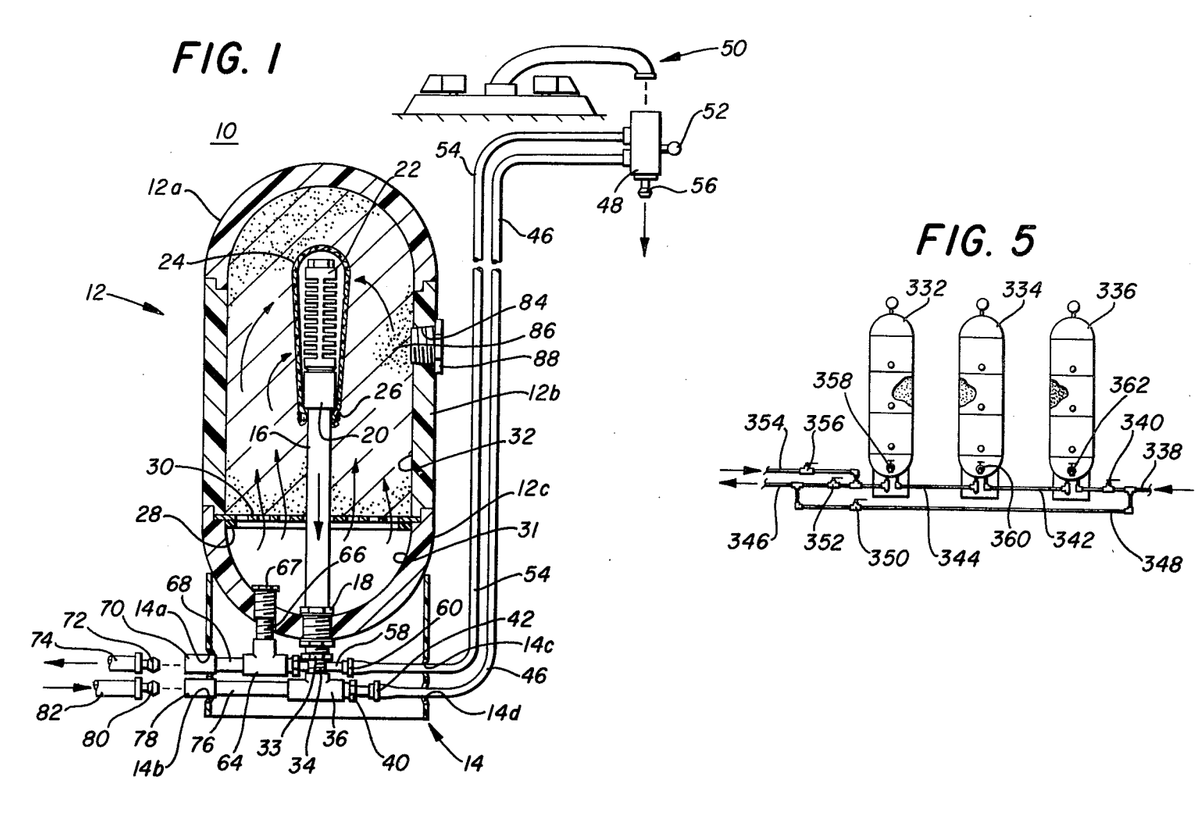
FIG. 1 is a partially sectioned elevation view of a water filter in accordance with the present invention.
FIG. 5 is a water filter system utilizing a plurality of water filters of the present invention.

In the following descriptive material, like reference numerals refer to like components in the various views. Referring to FIG. 1, there is shown a water filter 10 which is designed for use in a residential setting. Filter 10 is the preferred embodiment of the present invention. The filter 10 has a cylindrical housing 12 which is made up of three sections. An upper cap 12a is an integral molded member manufactured preferably of PVC plastic with a ⅜ inch thickness. The upper cap 12 is bonded by the use of PVC glue to a coupler 12b which is a cylindrical section also manufactured of PVC plastic. A lower cap 12c is similar to upper cap 12a and is bonded to the lower end of coupler 12b. Thus, the combination of upper cap 12a, coupler 12b and lower cap 12c forms an integral, closed, cylindrical housing 12 for the filter 10.

The housing 12 is bonded to a cylindrical base 14 which is provided with apertures 14a, 14b, 14c and 14d passing through the wall of the base. Base 14 supports housing 12 in an upright position.

A return line 16 is positioned vertically within housing 12 and is glued to a pipe fitting 18 which is mounted at the lower end of housing 12. A pipe coupler 20 is glued at the upper end of line 16 with a lateral line 22 threadedly engaged to the pipe coupler 20. Lateral line 22 is provided with a plurality of circumferential slots and in a selected embodiment is a Model PF-152285 manufactured by Pacfab. A tightly woven, nylon filter cloth 24 encloses the lateral line 22 and is tied to the lateral line with a nylon line 26 and is also secured into the threads of plastic pipe coupler 20.

A spacer ring 28 is positioned within the lower cap 12c to support a baffle plate 30 which forms a chamber 31 within housing 12. A chamber 32 is formed above baffle plate 30. Line 16 extends vertically through the center of baffle plate 30 and is glued at the passage through the baffle plate. Baffle plate 30 is secured along its outer edge to the lower cap 12c to form a strong seal with the housing 12. Baffle plate 30 is a round disc ¼ inch thick and is provided with a plurality of vertical holes therein, the holes preferably being approximately 3/64th of an inch in diameter and spaced approximately 1/16 inch apart. Baffle plate 30 is preferably manufactured of LEXAN (trademark of General Electric). The pipe fitting 18, which extends through the base of housing 12, is connected to a pipe adapter 33 that is in turn threaded to a pipe nipple 34 which is secured to a T 36. The output flow path from filter 10 through T 36 includes a hose barb 40, a compression hose clamp 42 and a hose 46. The entire return line of filter 10 includes the series of elements from line 16 through hose 46.

The hose 46 is connected to the input port of a diverter valve 48 which is connected to the outlet of a faucet 50. The operation of diverter valve 48 is controlled by the position of a rod 52 which directs the water received from faucet 50 through either an outlet hose 54 or through a snap nipple 56.

Hose 54 transfers water from faucet 50 into the filter 10 through a series of elements including a hose barb 58, a hose clamp 60, a T 64 and a nipple 66 which is joined to a brass pipe bushing 67 that extends through the lower end of housing 12 into chamber 31 below baffle plate 30.

The remaining connection to T 64 is engaged to a nipple 68 which is joined to a snap coupler 70. Coupler 70 is designed to engage a snap bushing 72 that is connected to a waste hose 74.

The T 36 is further connected to a nipple 76 that is engaged to a snap coupler 78 which engages the snap bushing 80 of a back wash hose 82. The other end of hose 82 connects to snap bushing 56 of diverter valve 48 for back washing filter 10. Couplers 70 and 78 are closed when no bushing is connected thereto.

Couplers 70 and 78 respectively extend through holes 14a and 14b in base 14. Lines 46 and 54 extend respectively through holes 14d and 14c.

After the water filter 10 is assembled, finely powdered charcoal 86 is introduced into the interior of housing 12 through an opening 84 in chamber 32 of housing 12. Chamber 32 is packed with powdered charcoal 86 until it becomes a compressed cake, then hole 84 is closed with a pipe plug 88.

In a typical application, the water filter 10 is installed in a residential setting and is positioned adjacent or beneath a faucet and sink, generally in a kitchen. The diverter valve 48 is secured to the outlet of a faucet 50. When the rod 52 is in a first position, the water from faucet 50 passes directly through diverter valve 48 and out of the snap nipple 56. This provides non-filtered water to the consumer. But when the consumer wishes to have filtered water, the rod 52 is pushed to a second position which causes the water from faucet 50 to be directed through line 54 into chamber 31 beneath baffle plate 30. The water collects in chamber 31 until sufficient pressure is built up to force the water through the tiny holes in the baffle plate 30. This serves to evenly distribute the water through the charcoal filter material 86. Water flow during filtering is indicated by the arrows within housing 12. When the water passes through the charcoal, various pollutants such as chlorine, algae and silt are trapped in the charcoal. The water working against gravity propagates upward through the filter material 86 and passes through the filter cloth 24 into the lateral line 22. The filter cloth 24 has a very tight weave and is designed primarily to prevent the entry of charcoal fines into the lateral line 22. The bulk of the particulate pollutants and the chlorine are trapped in approximately the first four inches of filter material above baffle plate 30. Within this region the chlorine becomes highly concentrated and acts to kill bacteria trapped by the filter. The remainder of the filtering material removes other polluting material and makes the water sparkling clear and pure.

The relatively large volume of charcoal within filter 10 provides filtration for a substantial quantity of water and can be used for an extended time since the use of filter 10 is limited to filtering water actually used for consumption rather than for all purposes. The charcoal 86 within the filter 10 will, however, become clogged after a period of time time depending upon such factors as the concentration of foreign matter in the water and the quantity of water used. The collection of algae and other organic matter will also tend to cause the growth of bacteria within the filter material over an extended period of time although this is impeded by the concentrated chlorine in the filter. The filter, however, can be easily back washed to clean the filter material and reuse it indefinitely. The back wash operation is carried out as follows. Hose 82 is connected at one end with bushing 80 to coupler 78 and the other end of hose 82 is connected to valve 48 with bushing 56. The control rod 52 of valve 48 is set to pass the water from faucet 50 directly to the hose 82. Hot water is used to back wash the filter 10 and if the water is at a temperature of 145° F. or hotter, it will pasturize the inside of the filter and serve to kill the bacteria in charcoal 86. Bushing 72 of hose 74 is connected to coupler 70. The hose 74 is positioned so that the waste water from filter 10 is dumped into the drain of a sink. The back washing is carried out for a period of at least 25 minutes to remove the majority of the filtered pollutants from the filter material within water filter 10. After the back washing is completed, the hose 82 is disconnected from diverter valve 48 and the waste water hose 74 is disconnected from the snap coupler 70 and both hoses are stored. During the back wash operation the hot water is forced up the return line 16 into the lateral line 22 and through the filter cloth 24. The hot back wash water then propagates through the charcoal filter material 86 in the reverse direction from normal flow. The water passes downward to the baffle plate 30 and collects beneath plate 30 in the bottom of housing 12. The water then passes through hose 74 to be dumped in the drain of the sink. The gravity flow of the water assists in removing the filtered foreign material.

Figure 2:
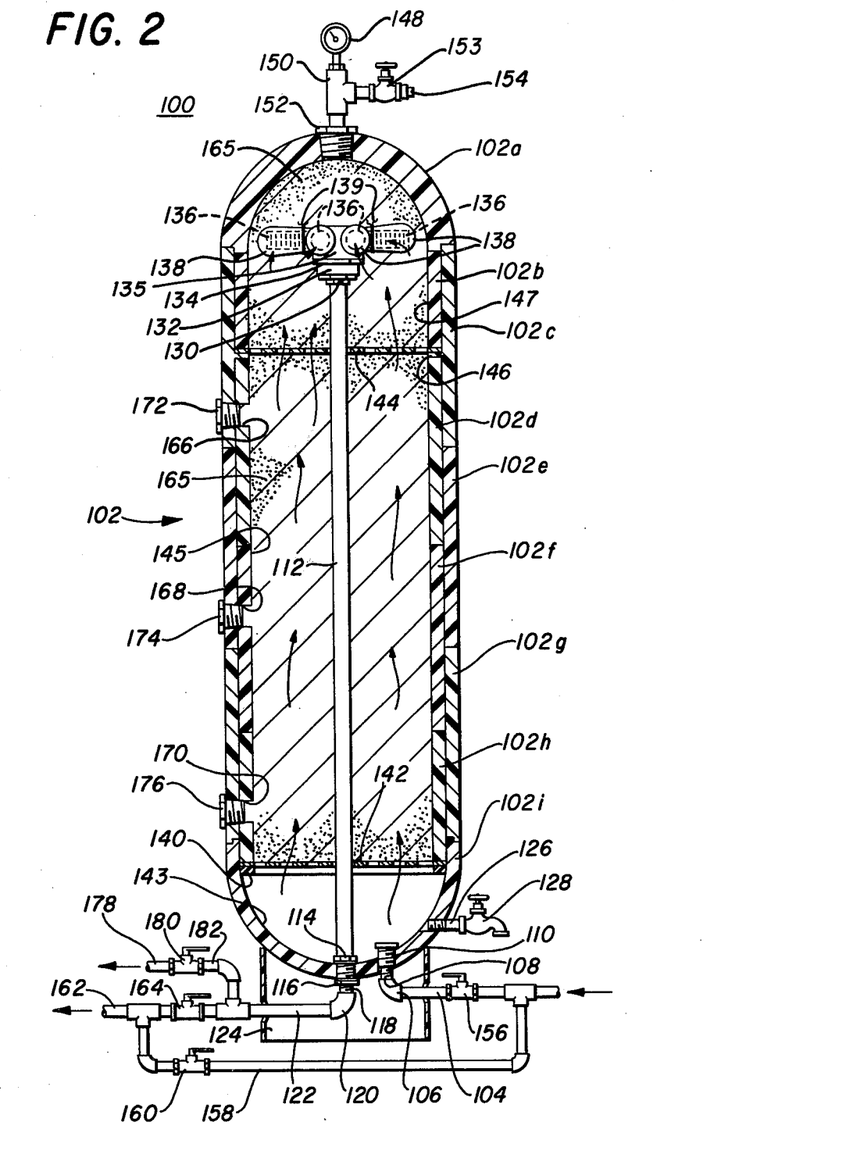
FIG. 2 is a partially sectioned elevation view of a further water filter in accordance with the present invention.

A further embodiment of the water filter of the present invention is illustrated in FIG. 2. Water filter 100 is a greater capacity unit than filter 10 shown in FIG. 1. Filter 100 has an elongate, cylindrical housing 102 which comprises a plurality of segments bonded together. Housing 102 includes an upper cap 102a, an adapter 102b, a coupler 102c, an adapter 102d, a coupler 102e, an adapter 102f, a coupler 102g, an adapter 102h and a lower cap 102i. The exterior diameter of the adapters is approximately the same as the interior diameter of the end caps and the couplers so that the adapters slide into the end caps and couplers.

A water inlet to filter 100 is provided through line 104 which is connected in series with an elbow 106, a nipple 108 and a pipe bushing 110 that is mounted in the base of lower end cap 102i.

Within housing 102 a return line 112 extends longitudinally within housing 102 along the axis thereof and is connected at the base of the housing to a pipe coupler 114. The pipe coupler 114 is mounted to extend through the lower cap 102i of housing 102. Coupler 114 is connected to a bushing 116 that is in turn threaded to a nipple 118. An elbow 120 is connected to the nipple 118 and to a water outlet line 122. The total return line for filter 100 includes all elements from line 112 through line 122.

The housing 102 is supported on a base 124 which is a cylindrical member having the lower end cap 102i bonded thereto. Lines 104 and 122 pass through the wall of base 124.

A pipe nipple 126 extends through the lower end cap 102i and is connected to a back wash waste water faucet 128.

At the upper end of line 112, a bushing 130 is connected to a reducer bushing 132 that is turn connected to an adapter 134. A lateral hub 135 is connected to the adapter 134 and has a group of eight lateral lines 136 connected to extend transverse to the return line 112. Each of the lateral lines 136 is covered with a nylon filter cloth 138 which is tied with a nylon line 140 to the base of the lateral line. There are eight individual lateral lines 136 extending outward from the lateral hub 138. The lateral lines 136 are similar to a lateral line 22 described in reference to FIG. 1, except that they are longer.

A spacer 140 is inserted into the lower cap 102i of housing 102. A baffle plate 142 is positioned on top of spacer 140 and receives line 112 passing through the center thereof. Baffle plate 142 establishes a chamber 143 at the lower end of housing 102. The coupler 102h is inserted into the lower cap 102i and locks the baffle 142 between the coupler and the spacer 140. Baffle plate 142 is similar to baffle plate 30 described in reference to water filter 10.

At the upper end of housing 102, a baffle plate 144 is supported on an internal ridge 146 within coupler 102c. The adapter 102b rests on the top of baffle plate 144 to secure the baffle plate within the housing 102. Baffle plate 144 defines a chamber 145 within housing 102 between plates 142 and 143 and a chamber 147 above baffle plate 144.

The various sections of housing 102 together with the base 124 are ¾ inch thick PVC plastic, the various parts being glued together utilizing conventional PVC glue.

A pressure gauge 148 is connected to a T 150 which is in turn connected to a bushing 152 that is mounted in the upper cap 102a of filter 100. The center line of T 150 is connected to a valve 153 that has a hose bib 154 connected at the outlet thereof.

The water flow through water inlet 104 is controlled by a valve 156. On the upstream side of the valve 156 a water bypass line 158 is connected to the water inlet. A valve 160 is connected in line 158 which is joined to a supply line 162. A valve 164 is connected between supply line 162 and the output line 122 of water filter 100.

Water filter 100 is charged with powdered charcoal 165 through holes 166, 168 and 170. The charcoal is packed into the filter to form a cake. The water filter 100 is typically filled with approximately 40 pounds of charcoal. After the unit is filled, the holes are closed with plugs 172, 174 and 176, respectively.

Hot water for back washing filter 100 is supplied through a hot water line 178 which is connected through a valve 180 to a line 182 that is connected into line 122.

Operation of the water filter 100 is now described in reference to FIG. 2. In the water filtering mode of operation valve 156 is open, valve 160 is closed, valve 164 is open, faucet 128 is closed and valve 180 is closed. Water is supplied through line 104 into chamber 143 of housing 102 through bushing 110 which comprises a section of the inlet line to filter 100. The water pressure working against gravity forces water through the holes in baffle 142 and drives the water upward through the filtering material 165 within housing 102. At the end of travel through the filter material the water passes through the upper baffle plate 144 and into chamber 147 which contains lateral lines 136. The water passes through the filter cloths 138 into the lateral lines 136 and downward through return line 112. The filtered water passes out of housing 102 through bushing 116 and into the output line 122. The water is then transferred through valve 164 to the output line 162 for transfer to the consumer.

After a period of time, the foreign matter in the incoming water removed by the filter material tends to clog the filter 100 which reduces the flow of water and increases the back pressure.

The filter is cleaned by back washing with hot water and this is carried out by operation of the various valves shown in FIG. 2. For the back wash operation, valve 156 is closed, valve 160 is opened, valve 164 is closed, valve 180 is open and faucet 128 is open and is connected to a line for receiving waste water. When valve 180 is opened, hot water, preferably 145° F. or hotter, is supplied to return line 112 and is forced out through the lateral lines 136. The hot, back wash water passes through filter material above baffle plate 144 until the pressure of the water drives it through the holes within the baffle plate and then into the filter material 165 within chamber 145. Baffle plate 144 serves to distribute the back wash water throughout the filter material. The back wash water is forced downward through the charcoal filter material, aided by gravity flow, and in the process thereof forces out the collected silt, algae and other materials. The high temperature of the water also tends to release the chlorine which has been trapped from the water by the charcoal. The chlorine is also carried along with the back wash water and removed from the filter. The back wash water together with the removed pollutants are transferred downward to the baffle plate 142. The back wash water passes through the holes in baffle plate 142 and collects beneath this plate in chamber 143 and is transferred to a waste disposal line through faucet 128. A typical time period for back washing unit 100 is 25 minutes. After the back wash operation is completed, the valves are returned to the original setting for normal operation.

Figures 3, 4:
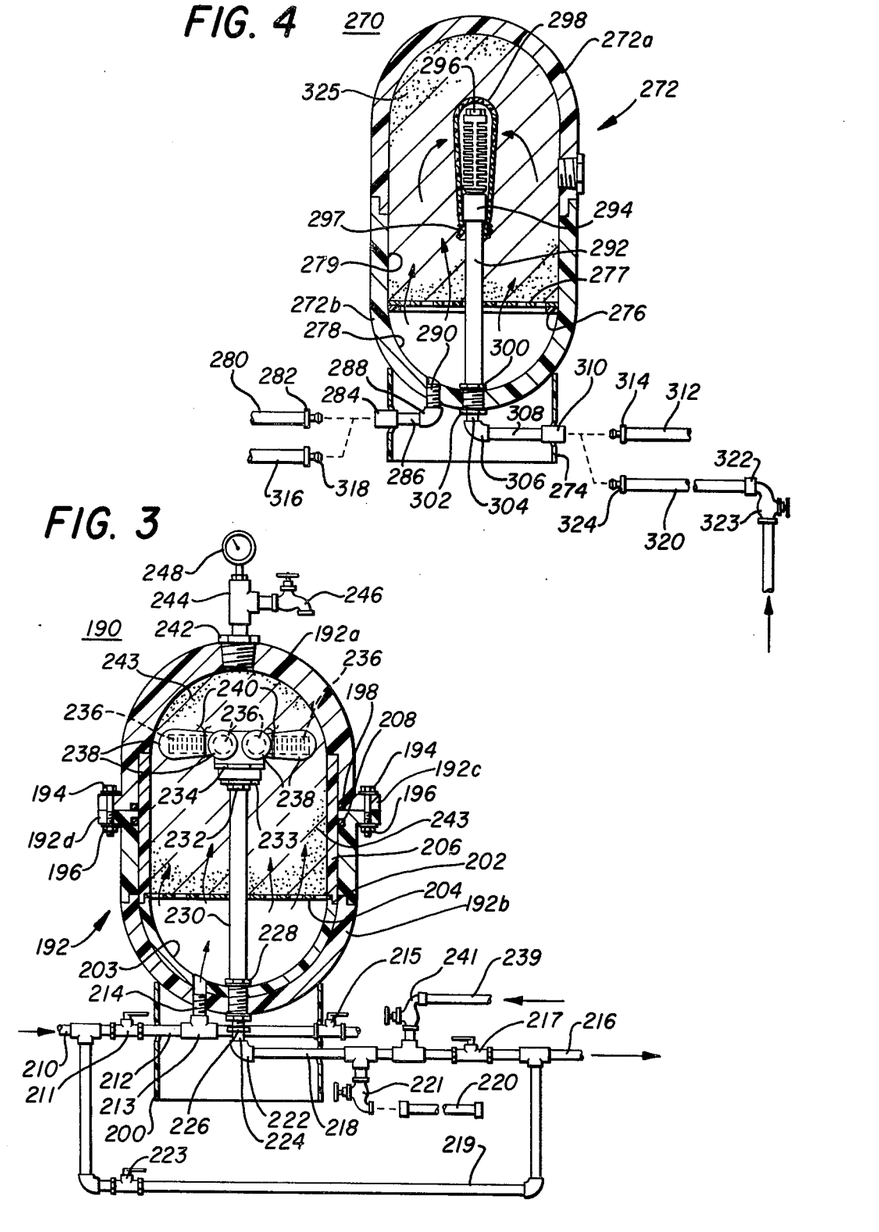
FIG. 3 is a partially sectioned elevation view of a further water filter in accordance with the present invention.
FIG. 4 is a partially sectioned elevation view of a still further water filter in accordance with the present invention.

A further embodiment of the water filter of the present invention is illustrated in FIG. 3. Water filter 190 includes a housing 192 comprising an upper cap 192a and a lower cap 192b. Caps 192a and 192b are provided with respective flanges 192c and 192d. The flanges have corresponding sizes and includes aligned holes therein for receiving bolts 194 which pass through the flanges 192c and 192d and are secured with nuts 196.

Grooves are provided on the flanges 192c and 192d to receive an O-ring 198 which provides a pressure seal for housing 192.

The housing 192 is supported upright on a base 200 which is a cylinder that is bonded to the lower cap 192b. Holes are provided in base 200 to permit passage of inlet and return lines.

The interior of lower cap 192b is molded to have an upstanding ridge 202 which supports a baffle plate 204. Plate 204 is similar to the baffle plates described above. The plate 204 has a plurality of small holes evenly distributed across the face thereof and the plate is approximately ¼ inch thick. The baffle plate 204 is held in place by a cylindrical liner 206 which mates with the interior of housing 192. The liner 206 is sealed with the housing 192 by an O-ring 208.

A water inlet line 210 is connected to a valve 211 which is in turn connected to a supply line 212. Line 212 is connected to a T 213 which is joined to a nipple 214 that extends through lower cap 192b. A valve 215 is connected to the remaining line of T 213.

An output line 216 is connected through a valve 217 to a line 218. Line 218 is connected to an elbow 222 that is joined to a nipple 224 which is connected into a coupling 226 that is connected through the base of lower cap 192b. A bypass line 219 is connected between lines 210 and 216 and includes a valve 223. Within the housing 192, a pipe coupler 228 is connected to coupler 226 and is in turn connected to and supports a vertical return line 230 positioned along the axis of housing 192. The upper end of line 230 is connected to a pipe reducer 232 that is connected to a pipe reducer 233 which is in turn connected to a lateral hub 234. A group of eight lateral lines 236 are connected in pairs to the hub 234. Each of the lateral lines 236 is covered with a nylon filter cloth 238 which is tied securely thereto by nylon line 240.

Hot water is supplied through a line 239 to a valve 241 that is connected to line 218.

A bushing 242 is connected through the upper cap 192a to a T 244. The center of the T is connected to a faucet 246 which is provided for quick washing of charcoal fines from filter 190. The remaining opening of T 244 is connected to a pressure gauge 248.

After the housing 192 is assembled, the bushing 242 is removed and the filter 190 is filled with powdered charcoal 243 which serves as the filtering medium. The housing 192 is sealed by replacing bushing 242.

The operation of filter 190 is now described in reference to FIG. 3. In the standard filtering configuration, valves 211 and 217 are open while valves 221, 223, 246 and 215 are closed. Unfiltered municipal water is supplied through line 210 into chamber 203 housing 192. The water in chamber 203 is driven upward working against gravity by water pressure through the holes in baffle plate 204 and distributed throughout the charcoal 243 within housing 192. As the water passes through the charcoal various impurities such as chlorine, silt and algae are removed from the water by the charcoal. At the upper end of the housing 192 the water passes through the filter cloths 238 into the lateral lines 236. The water that is collected is passed down through return line 230 and out through lines 218 and 216. The water passing out through line 216 is filtered and is ready for use by the consumer.

As the filter operates, foreign material is removed from the water and held within the filter material. As the amount of this material increases, the flow of water becomes slower and slower and will completely stop flowing if not back washed. In addition, if there is no chlorine in the water, there is a tendency for the growth of bacteria due to the presence of organic matter within the filter medium. The filtered matter removed from the water by the filter can be removed therefrom by a back wash operation. The steps necessary to carry out a quick back wash operation are as follows. A water hose 220 is connected to valve 221 which is opened. Valves 211, 217 and 241 are closed while valves 223 and 215 are opened. Valve 223 permits the incoming municipal water to bypass the filter and supply water and water pressure to the household. The water supplied through hose 220 travels up through line 222, through lateral lines 236 into filter material 243 where the trapped foreign matter is washed down through plate 204 and out through valve 215. This operation provides a quick back wash of filter 190.

A more thorough back wash is carried out as follows. The hot water from line 239 is supplied through valve 241 into the return line 230 where it passes out through lateral lines 236. The hot water travels from the lateral lines through the charcoal filter material and picks up the various filtered matter from the charcoal and transports it downward through baffle plate 204 into chamber 203 at the base of housing 192. The waste water is then passed through nipple 214 and out through valve 215. The unit 190 is back washed with hot water at 145° F. or hotter for 25 minutes in order to dislodge the collected particulate matter and kill bacteria.

A still further embodiment of the present invention is illustrated in FIG. 4. Water filter 270 is particularly designed for use in filtering water which is supplied to ice machines. Filter 270 includes a housing 272 which comprises an upper cap 272a and a lower cap 272b. The housing 272 is mounted on a base 274 which is bonded thereto.

A spacer ring 276 is positioned within the lower cap 272b to support a baffle plate 277 which is similar to the baffle plates described above. Plate 277 divides the interior of housing 272 into a lower chamber 278 and an upper chamber 279. Incoming unfiltered water is supplied through a line 280 to a self-sealing coupler plug 282 that is connectable to a coupler 284. The coupler 284 is connected to a nipple 286 which is in turn connected to an elbow 288. The elbow 288 is connected to a nipple 290 which extends through the lower cap 272b into chamber 278.

Within housing 272 there is positioned a vertical return line 292 which has the upper end thereof connected through a pipe coupler 294 to a lateral line 296. The lateral line 296 is the same as the lateral lines described above. A filter cloth 298 covers the lateral line 296 and coupler 294 and is tied thereto with a nylon line 297.

The lower end of return line 292 extends through baffle plate 277 and is connected to a pipe coupler 300 which is in turn connected to a bushing 302 that passes through the lower cap 272b. The bushing 302 is connected to a nipple 304 which is in turn connected to an elbow 306. The elbow 306 is connected to a transfer line 308 that is in turn joined to a snap coupler 310. An output line 312 is provided with a snap coupler bushing 314 for connection to coupler 310. The total return line for filter 270 includes the group of elements 292, 300, 302, 304, 306 and 308.

Additional lines provided for back wash operation are a waste water hose 316 provided with a snap coupler bushing 318 at one end thereof, the coupler adapted for connecting to coupler 284. A main pressure water hose 320 is fitted with a hose connection 322 at one end for connection to a faucet 323 and a snap connector bushing 324 at the opposite end thereof.

The chamber 279 in housing 272 is filled with powdered charcoal 325 which is pressed into a cake to serve as the filtering material.

In a typical installation, high pressure water is supplied through line 280 which is snap coupled to coupler 284 to provide water into the housing 272. The water collects in chamber 278 of housing 272 beneath baffle plate 277 until the pressure of the water is sufficient to drive the water upward through the holes in the baffle plate working against gravity into the charcoal filtering material. As the water progresses upward through the charcoal filter, various pollutants in the water are removed by the charcoal. The water progresses until it reaches the filter cloth 298. The water passes through the filter cloth into the lateral line 296 and down the return line 292. The filtered water passes outward through the transfer line 308 into the line 312 for connection to the consumer device, primarily an ice machine. All of the water that is transferred from line 280 into line 312 is filtered to remove foreign matter.

After the filter 270 has operated for a period of time, the foreign matter collected from the water will tend to accumulate in the filter thereby increasing the back pressure and decreasing the flow rate through the filter. In order to remove this collected matter, the filter 270 is back washed. This is carried out as follows. The waste hose 316 is snap coupled to the coupler 284 in place of line 280. The free end of hose 316 is connected to a waste water drain. Line 320 is connected so that the coupler 322 is connected to the faucet adapter 323 which supplies hot water. The snap coupler bushing 324 is connected to coupler 310 in place of the supply line 312. Hot water is supplied under pressure through line 320 into the return line 292 and forced upward and out through lateral line 296 and filter cloth 298. The hot back wash water is distributed throughout the filter material and descends to baffle 277 where it passes through the holes therein. The back wash water picks up the foreign matter removed by the filter and collects in chamber 278 below the baffle plate 277 and is then transmitted through line 316 for disposal. The back wash operation is carried out preferably with water having a temperature of at least 145° F. for a time of 25 minutes generally at an interval of once every two weeks. After the back wash operation is complete, the hoses 316 and 320 are removed and lines 280 and 312 reconnected to filter 270 for normal operation.

In large installations such as factories and farms, a plurality of the water filters described herein can be connected in series to provide a filtration capability for a large volume of water over an extended period of time. Such an arrangement is illustrated in FIG. 5. This arrangement uses three water filters, 332, 334 and 336 connected as a series bank of water filters. Each of the filters 332-336 corresponds to the water filter 100 shown in FIG. 2. A water inlet line 338 receives unfiltered water and transfers it through a valve 340 to the input of filter 336. The water is passed through filter 336 to output line 342 to the input of filter 334. The water from filter 334 is transferred through line 334 to output line 346. A bypass line 348 is connected between lines 338 and 346 and includes a valve 350 therein. A valve 352 is connected between the output of water filter 332 and line 346. A hot water line 354 is connected to the output of filter 332 and includes a valve 356 therein.

The bank of water filters shown in FIG. 5 is provided for filtering large quantities of water. Filters 332 and 334 are filled with approximately 40 pounds each of powdered charcoal just as described above in reference to water filter 100 in FIG. 2. Filter 336 is, however, preferably filled with sand for initial removal of large particulate matter.

In normal operation the filtration of water is provided by opening valves 340 and 352 while closing valves 350 and 356. This causes the unfiltered water to flow inward from line 338 to each of the three water filters, 332, 334 and 336 and out through supply line 346 to the consumer.

After the bank of water filters has operated for a period of time and sufficient particulate matter has been filtered to cause the filter elements to become clogged, the filters are back washed to remove the collected material. This is accomplished by closing valves 340 and 352 and opening valves 356 and 350. This causes hot water from line 354 to flow into the output line of filter 332 and back wash through the charcoal therein. Filter 332 is provided with a faucet 358 which is opened during the back wash operation to remove the waste water therefrom. After unit 332 has been cleaned, faucet 358 is closed and the hot water therefrom is forced into the output of filter 334. The water filter 334 is provided with a waste water faucet 360 which is open to provide a release for the waste water collected during back washing of unit 334. After the charcoal in unit 334 has been cleaned, faucet 360 is closed and the hot back wash water is transmitted through line 342 to the output of filter 336. A faucet 362 at the base of water filter 336 is opened to permit the waste water from the back wash operation to be dumped therethrough. The back wash procedure for each of the units is essentially the same procedure for the filter 100 illustrated in FIG. 2. After the back wash operation has been completed, the valves are returned to the first setting for normal operation.

In summary, the present invention provides a water filter which can be configured in various embodiments for different applications, but in each case to provide filtered water suitable for human consumption and to enable the unit to be easily back washed for removal of the collected foreign matter.

Although several embodiments of the invention have been illustrated in the accompaning Drawings and described in the foregoing Detailed Description, it will be understood that the invention is not limited to the embodiments disclosed, but is capable of numerous rearrangements, modifications and substitutions without departing from the scope of the invention.

We claim:

1. A water filter, comprising:
   an elongate, closed housing;
   a baffle plate secured transversely within said housing and separating the interior of said housing into a first smaller chamber and a second larger chamber, said baffle plate having a plurality of passages extending therethrough;
   an inlet line passing through said housing into said first chamber for receiving water provided to the water filter;
   a return line passing through said housing into said first chamber, through said baffle plate and extending into said second chamber;
   a lateral line connected to the end of said return line within said second chamber, said lateral line having a plurality of openings for passing water therethrough;
   a filtering medium substantially filling said second chamber; and
   a cylindrical base connected to a lower end of said housing for supporting said housing in an upstanding position, said return line and said inlet line passing through the wall of said base and entering said housing from within said base.

2. The water filter recited in claim 1 including a filter cloth enclosing said lateral line wherein water that passes through said lateral line also passes through said filter cloth.

3. The water filter recited in claim 1 wherein said return line is positioned along the axis of said housing and passes through the center of said baffle plate and the center of an end of said housing defining said first chamber.

4. The water filter recited in claim 1 wherein said filter medium is powdered charcoal.

5. The water filter recited in claim 1 wherein said housing comprises a plurality of individually molded sections which are joined together to form said housing as an integral unit.

6. A water filter, comprising:
an elongate, closed housing;
a baffle plate secured transversely within said housing proximate a first end thereof, said baffle plate separating the interior of said housing into a first smaller chamber bounded by said first end and a second larger chamber, said baffle plate further having a plurality of passages between said chambers;
an inlet line passing through said housing into said first chamber for receiving water provided to the water filter;
a return line passing through said first end of said housing, and extending through said baffle plate into said second chamber;
a lateral line connected coaxially to the end of said return line within said second chamber, said lateral line having a plurality of openings for passing water therethrough;
a filtering medium substantially filling said second chamber; and
a fitst T connector joined to the end of said inlet line external to said housing;
a second T connector joined to the end of said return line external to said housing; and
self closing snap couplers joined to at least one of the free ends of each of said T connectors.

7. The water filter recited in claim 6 including:
a diverter valve connectable to a water outlet and having input and output ports;
a first hose having a snap bushing on one end thereof connectable to one of said couplers attached to said first T connector and having the remaining end thereof connected to said output port; and
a second hose having a snap bushing on one end thereof connectable to one of said snap couplers attached to said second T connector and the remaining end thereof connected to said input port.

8. The water filter recited in claim 7 including:
a back wash hose having a snap bushing on one end thereof connectable to one of said couplers attached to said second T connector and a snap coupler on the opposite end connectable to said diverter valve for supplying water from said water outlet to back wash the water filter; and
a waste water hose having a snap bushing on one end thereof connectable to one of said couplers attached to said first T connector for receiving waste water when said water filter is back washed.

9. The water filter recited in claim 6 including a filter cloth enclosing said lateral line wherein water that passes through said lateral line also passes through said filter cloth.

10. The water filter recited in claim 6 wherein said return line is positioned along the axis of said housing and passes through the center of said baffle plate and through the center of said first end.

11. The water filter recited in claim 6 including a cylindrical base connected to an end of said housing for supporting said housing in an upstanding position, said return line and said inlet line passing through the wall of said base and entering said housing from within said base.

12. The water filter recited in claim 6 wherein said filter medium is powdered charcoal.

13. The water filter recited in claim 6 wherein said housing comprises a plurality of individually molded sections which are joined together to form said housing as an integral unit.

14. A water filter comprising:
an elongate closed housing comprising two opposed end sections and at least one cylindrical tublar intermediate section;
tubular liner means disposed in sleeved relationship within said intermediate section;
a first baffle plate secured transversely within said housing by said liner means and one of said sections of said housing, said first baffle plate defining within said housing a first chamber bounded by said first end and said first baffle plate, said first baffle plate having a plurality of passages extending therethrough to provide fluid passage through said first baffle plate;
a second baffle plate secured transversely within said housing by said liner means and one of said sections proximate a second end thereof and opposite said first end, said second baffle plate defining within said housing a second chamber bounded by said first and second baffle plates and a third chamber bounded by said second end and said second baffle plate, said second baffle plate having a plurality of passages extending therethrough to provide fluid passage through said second baffle plate;
an inlet line passing through said housing into said first chamber for receiving water provided to the water filter;
a return line passing through said housing into said first chamber, through said first baffle plate into said second chamber and through said second baffle plate into said third chamber;
at least one lateral line coupled to the end of said return line within said third chamber, said lateral line having a plurality of openings for passing water therethrough; and
a filtering medium substantially filling said second chamber.

15. The water filter recited in claim 14 including a lateral line head connected to the end of said return line within said third chamber and a plurality of said lateral lines are connected to said head and are positioned transverse to the axis of said housing.

16. The water filter recited in claim 14 including a filter cloth for each of said lateral lines, said filter cloths enclosing said lateral lines wherein water that passes through one of said lateral lines also passes through one of said filter cloths.

17. The water filter recited in claim 14 wherein said return line is positioned along the axis of said housing and passes through the centers of said baffle plate and the center of said first end of said housing.

18. The water filter recited in claim 14 including a cylindrical base connected to an end of said housing for supporting said housing in an upstanding position, said return line and said inlet line passing through the wall of said base and entering said housing from within said base.

19. The water filter recited in clam 14 wherein said filter medium is powdered charcoal.

20. The water filter recited in claim 14 wherein said housing comprises a plurality of individually molded sections which are joined together to form said housing as an integral unit.

21. A water filter comprising:
an elongate, cylindrical closed housing, said housing comprising first and second molded plastic sections each having a closed end and an open end, said open ends of said housing sections facing each other;

a cylindrical liner extending within said housing sections in sleeved relationship thereto and extending across the interface of the open ends of said first and second housing sections, said housing sections each further including an outward extending flange, said flanges having a plurality of holes therein, said housing sections being secured together with bolts extending through said holes and further including O-rings positioned between said sections and said liner for sealing said housing;

a baffle plate secured transversly within said housing and separating the interior of said housing into a first smaller chamber and a second larger chamber, said baffle plate having a plurality of passages extending therethrough;

an inlet line passing through said housing into said first chamber for receiving water provided to the water filter;

a return line passing through said housing into said first chamber, through said baffle plate and extending into said second chamber;

a lateral line head connected to the end of said return line within said second chamber;

a plurality of lateral lines connected to said lateral line head and extending transverse to the axis of said housing; and a filtering medium substantially filling said second chamber.

22. The water filter recited in claim 21 including a filter cloth for each of said lateral lines, said filter cloths enclosing said lateral lines wherein water that passes through one of said lateral lines also passes through one of said filter cloths.

23. The water filter recited in claim 21 wherein said return line is positioned along the axis of said housing and passes through the center of said baffle plate and the center of said first end of said housing.

24. The water filter recited in claim 21 including a cylindrical base connected to an end of said housing for supporting said housing in an upstanding position, said return line and said inlet line passing through the wall of said base and entering said housing from within said base.

25. The water filter recited in claim 21 wherein said filter medium is powered charcoal.

26. A water filter, comprising:
an elongate, closed housing;
a baffle plate secured transversely within said housing and separating the interior of said housing into a first smaller chamber and a second larger chamber, said baffle plate having a plurality of passages extending therethrough;

an inlet line passing through said housing into said first chamber for receiving water provided to the water filter;

a return line passing through said housing into said first chamber, through said baffle plate and extending into a region of said second chamber opposite said baffle plate;

a first self closing snap coupler connected to the end of said inlet line external to said housing;

a second self closing coupler connected to the end of said return line external to said housing;

a lateral line connected to the end of said return line within said second chamber, said lateral line having a plurality of openings for passing water therethrough; and a filtering medium substantially filling said second chamber.

27. The water filter recited in claim 26 including: a back wash hose having a snap bushing at one end thereof connectable to said second snap coupling for providing water to back wash the water filter; and a waste water hose having a snap bushing at one end thereof connectable to said first snap coupler for receiving waste water from the water filter when the water filter is back washed.

28. The water filter recited in claim 26 further including a filter cloth enclosing said lateral lines wherein water that passes through said lateral line also passes through said filter cloth.

29. The water filter recited in claim 26 wherein said return line is positioned along the axis of said housing, and passes through the center of said baffle plate and the center of an end of said housing defining said first chamber.

30. The water filter recited in claim 26 further including a cylindrical base connected to an end of said housing for supporting said housing in an upstanding position, said return line and said inlet line passing through the wall of said base and entering said housing from within said base.

31. The water filter recited in claim 26 wherein said filter medium is powdered charcoal.

32. The water filter recited in claim 26 wherein said housing comprises a plurality of individually molded sections which are joined together to form said housing as an integral unit.

* * * * *